US006233733B1

(12) United States Patent
Ghosh

(10) Patent No.: US 6,233,733 B1
(45) Date of Patent: *May 15, 2001

(54) METHOD FOR GENERATING A JAVA BYTECODE DATA FLOW GRAPH

(75) Inventor: Sanjoy Ghosh, Sunnyvale, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,212

(22) Filed: Sep. 30, 1997

(51) Int. Cl.[7] ........................................... G06F 9/45
(52) U.S. Cl. ....................................................... 717/7
(58) Field of Search ................... 395/704, 710; 717/4, 5, 6, 7, 8, 9, 10; 712/216, 217

(56) References Cited

U.S. PATENT DOCUMENTS 5,650,948 * 7/1997 Gafter .................................. 364/578

OTHER PUBLICATIONS

Aho, et al., "Code Optimization", Mar. 1988, Compliers–Principles, Techniques, and Tools, Addison–Wesley Publishing Co., Chapter 10, pp. 585–722.
Allen, et al., "A Program Data Flow Analysis Procedure", Mar. 1976, Communications of the ACM, vol. 19, No. 3, pp. 137–147.
Hecht, et al., "A Simple Algorithm for Global Data Flow Analysis Problems", Dec. 1975, SIAM Journal of Computing, vol. 4, No. 4, pp. 519–532.
Kennedy, Ken, "A Global Flow Analysis Algorithm", 1971, International Journal of Computer Math, Section A., vol. 3, pp. 5–15.
O'Connor, J.M., et al., "PicoJava–I: The Java Virtual Machine in Hardware", Citation and Abstract Search Results View Full Page, IEEE/IEE Electronic Library, Mar./Apr. 1997, pp. 45–53.

* cited by examiner

Primary Examiner—St. John Courtenay, III
Assistant Examiner—George Opie
(74) Attorney, Agent, or Firm—Thelen Reid & Preist LLP; David B. Ritchie

(57) ABSTRACT

According to a first aspect of the present invention, a method for linking bytecodes of an uninterrupted block of bytecodes in the formation of a data flow graph comprises the steps of scanning the uninterrupted block of bytecodes in a forward manner to identify the start of each of the bytecodes, scanning in a backward manner bytecodewise each of the bytecodes in the uninterrupted block of bytecodes, and generating a link in the data flow graph that links each of the bytecodes to all other of the bytecodes used by the each of the bytecodes.

According to a second aspect of the present invention, a method for linking bytecodes between uninterrupted blocks of bytecodes in the formation of a data flow graph, the uninterrupted blocks of bytecodes having links according to an order of execution of the uninterrupted blocks and wherein a stack state has been generated for each of the uninterrupted blocks of bytecodes, comprises the steps of stepping through a first path of a plurality of paths of the order of execution that terminates in a join to generate a link in the data flow graph between each bytecode producing a value in one of the uninterrupted blocks and each bytecode consuming the value in another of the uninterrupted blocks in the first path, and duplicating each link in the first path with a link for each bytecode in all of the plurality of paths other than the first path for each bytecode producing a value having a similar stack location to each bytecode producing a value in one of the uninterrupted blocks in the first path.

7 Claims, 4 Drawing Sheets

METHOD FOR GENERATING A JAVA BYTECODE DATA FLOW GRAPH

BACKGROUND OF THE INVENTION

1. Field of the Invention

The present invention relates to the optimization of Java class files. More particularly, the present invention relates to the generation of aspects of a data flow graph from a Java classfile optimizer that identifies the propagation of data values in blocks of bytecode and between blocks of bytecode.

2. The Prior Art

A known problem for software developers and computer users is the lack of portability of software across operating system platforms. Attempts to address this problem must include means of ensuring security as computers are linked together in ever expanding networks, such as the World Wide Web. As a response to both of these concerns, the JAVA programming language was developed at Sun Microsystems as a platform independent, object oriented computer language designed to include several layers of security protection.

Java achieves its operating system independence by being both a compiled and interpreted language. First, Java source code, which consists of Java classfiles, is compiled into a generic intermediate format called Java bytecode. Java's bytecodes consist of a sequence of single byte opcodes, each of which identify a particular operation to be carried out. Additionally, some of the opcodes have parameters. For example, opcode number 21, iload <varnum>, takes the single-word integer value stored in the local variable, varnum, and pushes it onto a stack.

Next, the bytecodes are interpreted by a Java Virtual Machine (JVM) which translates the bytecodes into native machine code. The JVM is a stacked-based implementation of a "virtual" processor that shares many characteristics with physical microprocessors. The bytecodes executed by the JVM are essentially a machine instruction set, and as will be appreciated by those of ordinary skill in the art, are similar to the assembly language of a computing machine. Accordingly, every hardware platform or operating system may have a unique implementation of the JVM, called a Java Runtime System, to route the universal bytecode calls to the underlying native system.

When developing the JAVA bytecode instruction set, the designers sought to ensure that it was simple enough for hardware optimization and also included verification means to provide security protection and to prevent the execution errors or system crashes that can result from improperly formatted bytecode. As Java's bytecodes contain significant type information, the verification means are able to do extensive type checking when the bytecodes are first retrieved from the internet or a local disk. As a result, the interpreter of the native machine need only perform minimal type checking at run time. Unlike languages such as Small-Talk that provide protection by performing extensive runtime checks, Java executes more quickly at run time.

Although Java provides security through verification means and portability through bytecodes, Java programs lag natively compiled programs, written in languages like C/C++, in their execution time. When a user activates a Java program on a Web Page, the user must wait not only for the program to download but also to be interpreted. To improve Java's execution time, optimizations can be introduced into the processing of Java bytecodes. These optimizations can be implemented in a variety of manners including as Stand-Alone Optimizers (SAO) or as part of Just-in-Time (JIT) compilers.

A SAO transforms an input classfile containing bytecode into an output classfile containing bytecodes that more efficiently perform the same operations. A JIT transforms an input classfile containing bytecode into an executable program. Prior to the development of JITs, a JVM would step through all the bytecode instructions in a program and mechanically perform the native code calls. With a JIT compiler, however, the JVM first makes a call to the JIT which compiles the instructions into native code that is then run directly on the native operating system. The JIT compiler permits natively complied code to run faster and makes it so that the code only needs to be compiled once. Further, JIT compilers offer a stage at which the executable code can be optimized.

To either optimize or compile bytecodes involves the translation of the source bytecodes into what is known in the art as an intermediate representation (IR). The IR provides information about two essential components of a program: the control flow graph (CFG) and the data flow graph (DFG). Subsequently, the IR is transformed for compilers into object code and for optimizers into an improved version of the source code format.

The CFG breaks the code into blocks of bytecode that are always performed as an uninterrupted group and establishes the connections that link the blocks together. The DFG maps the connections between where values are produced and where they are used. This includes connections within blocks of bytecodes and also connections between blocks of bytecodes. Because Java programs frequently use stack locations as implicit variables, tracking the propagation of values is a difficult process. When extracting the data flow information to generate the DFG for the IR, the prior art approach has been to perform a complete simulation of both the stack and iterations through all possible flow paths.

In contrast to traditional compilers where end users only interact with compiled programs, the run time nature of Java creates a significant incentive to optimize the speed and efficiency of Java optimizers and JIT compilers. Accordingly, it is an object of the present invention to provide a method for generating a DFG from the source bytecodes to form an IR that optimizes the speed and efficiency of Java optimizers and JIT compilers.

These and many other objects and advantages of the present invention will become apparent to those of ordinary skill in the art from a consideration of the drawings and ensuing description of the invention.

SUMMARY OF THE INVENTION

The present invention is directed to the optimization of Java class files by improving the efficiency of generating a DFG for the IR.

According to a first aspect of the present invention, a forward scan of an uninterrupted bytecode block from a bytecode source file is performed to identify the start of each bytecode in the uninterrupted block. Next, a backwards scan is performed. For each bytecode in the block, a DFG node is created, links to all the values used by the bytecode in the block are established, and links to preceding or subsequent nodes in the file are created.

According to a second aspect of the invention, the bytecode blocks are linked in the file's order of execution and a stack state is generated for each block of code. For each join statement generated by the CFG, one path of the CFG is stepped through. Next, links are established in the DFG between locations where values are used and where the values are produced. Finally, for all blocks parallel to the blocks producing values the links for bytecodes occupying the same stack state location are duplicated.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1A:
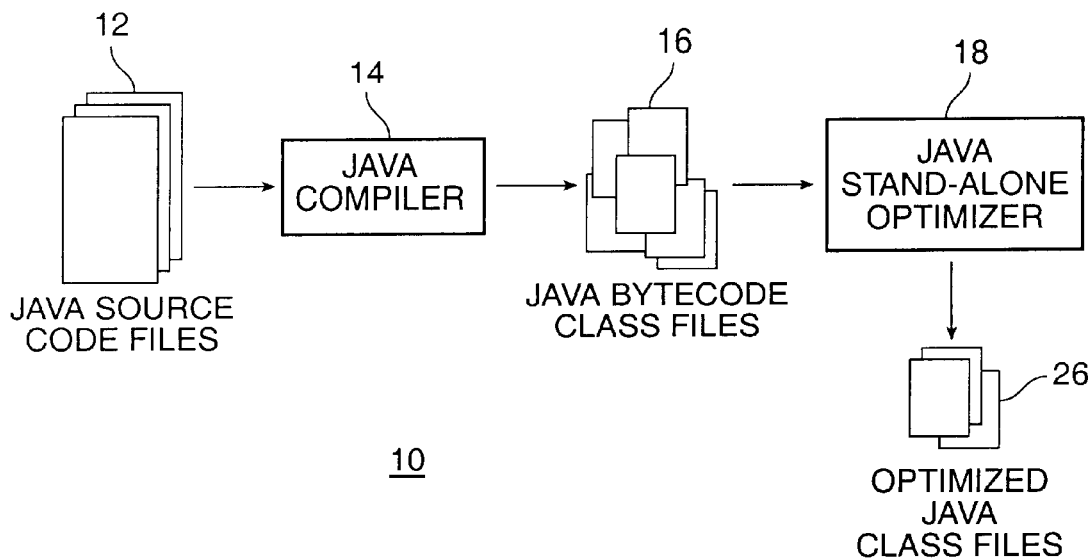
FIG. 1A is a flow diagram of the optimization of a JAVA bytecode source file using a stand alone optimizer according to the present invention.
Figure 1B:
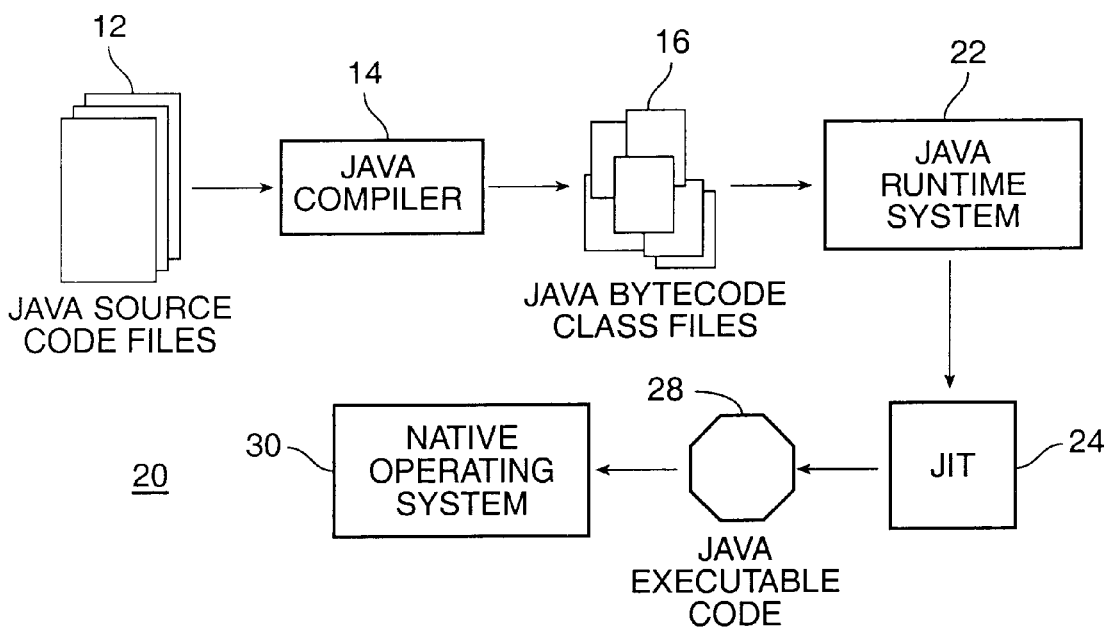
FIG. 1B is a flow diagram of the optimization of JAVA bytecode source file using a just in time compiler according to the present invention.

Referring first to FIGS. 1A and 1B, simplified flow diagrams 10 and 20 of the optimization of a Java bytecode source file are illustrated. In both flow diagrams 10 and 20, Java source code file 12 is compiled by a Java compiler 14 into Java bytecode classfiles 16. In flow diagram 10, the classfiles are operated on by a SAO 18, and in flow diagram 20, the classfiles are passed through a Java Runtime System 22 to a JIT compiler 24. The Java SAO 18 outputs Java classfiles 26 containing bytecodes that perform the same operations as the input classfiles, only in an optimized manner. The JIT 24 outputs executable code 28 that can run directly on the native operating system 30. Those of ordinary skill in the art will recognize that the procedures described in FIG. 1 are merely illustrative and that there exist other structures within which classfiles may be optimized.

In processing an input bytecode source classfile, both an SAO and a JIT form an IR. As described above, an IR is a succinct and straightforward structuring of the control and data flow information of a program into a CFG and DFG.

The CFG represents the information regarding the sequence and order of the execution of the bytecode instructions as blocks of code linked in the order of execution of the program. The blocks of code are sections of bytecode that are always performed as an uninterrupted group, and the links between the blocks of code are bytecode branch, conditional, or jump instructions.

Figure 2:
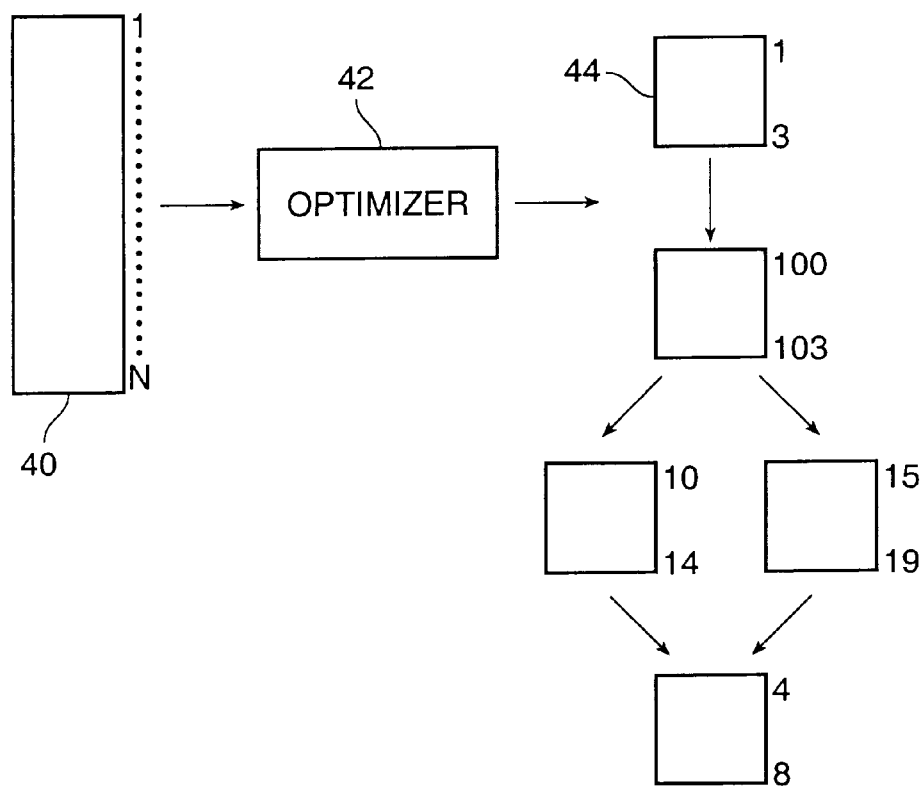
FIG. 2 is a flow diagram illustrating the generation of control flow graph from a bytecode source file suitable for use in the present invention.

FIG. 2 is a flow diagram that illustrates the generation of the CFG from a bytecode classfile 40. It should be appreciated that there are several known methods for generating a CFG. The specifics of any such method will not be disclosed herein to avoid overcomplicating the disclosure and thereby obscuring the present invention. The procedure begins with a classfile 40 containing an ordered sequence of bytecode instructions numbered from 1 through N. The numbers 1 through N are analogous to the numbering of lines in a computer program as is known in the art. Next, an optimizer 42 processes the bytecode classfile 40 to extract the control flow information from the bytecodes.

The control flow information is illustrated by the CFG 44. For example, the CFG 44 may indicate that for classfile 40 that bytecode instructions 1 through 3 are first executed, instructions 100 through 103 are next executed, either instructions 10 through 14 or 15 through 19 are next executed, and finally instructions 4 through 8 are executed before the remainder of the bytecode instructions execute. It will be appreciated that the CFG 44 is an example only, and that any number of CFGs may be generated from the classfile 40 by the optimizer 42.

As described above, once the CFG has been generated, the DFG will be generated. According to the present invention, two aspects of the DFG are generated from the CFG. In one aspect, the propagation of values within blocks of bytecode is determined. As is known in a typical JAVA program, data values are produced in one location and consumed in another. The first aspect of the present invention relates to establishing the connections between the production and consumption points that occur within uninterrupted blocks of code. The present invention allows implicit variables to be easily recognized and for their values to be immediately linked in the DFG to the bytecode(s) using them.

Figure 3:
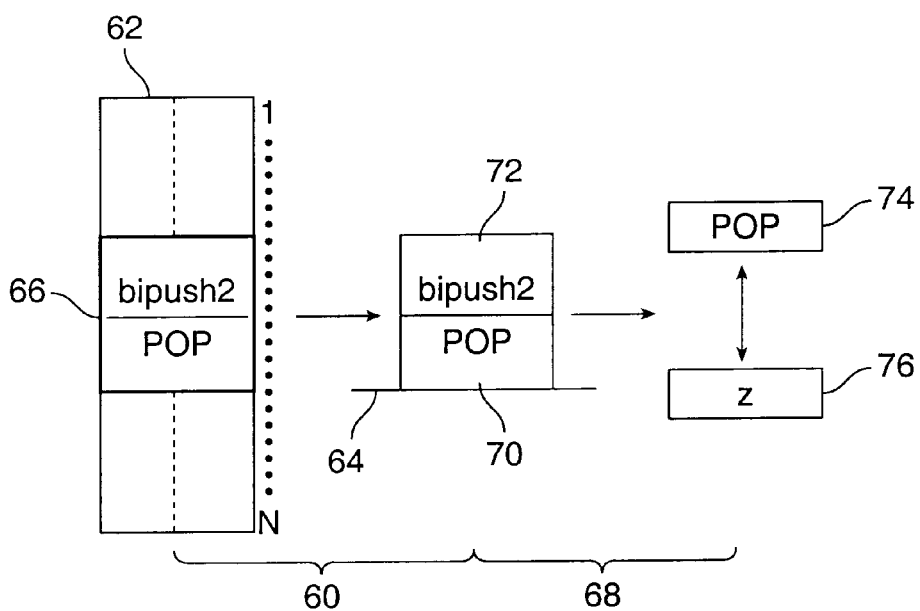
FIG. 3 is a flow diagram of the generation of data flow graph according to the prior art.

Unlike the prior art, the present invention avoids the approach taken in the prior art of constructing a stack to determine the values used by bytecodes. For example, in FIG. 3, a block diagram of a known method for generating links within a code block of a CFG is illustrated. The diagram demonstrates the principle stages employed to determine the value of implicit stack location variables when generating a DFG. During stage 60, the operations of an input sequence of bytecodes 62 are simulated to create a version of the stack 64 that they represent. The stack shown 64 presents only a portion 66 of the input sequence of bytecodes 62. During stage 68, the stack 64 is executed, and it is determined that the POP instruction 70 is associated with the value "2" due to the preceding BIPUSH "2" 72 instruction. This information is stored in a DFG node represented by reference numerals 74 and 76.

According to the preferred embodiment of the present invention, a node tree is employed. When values are produced by the bytecode classfile, a new node is created in the tree. This node is then connected to the rest of the tree by linking it to the value's production and consumption points, as they become known. In this manner, the propagation of data values through a program can be readily traced. Those of ordinary skill in the art will recognize that a variety of data structures could be used.

Figure 4:
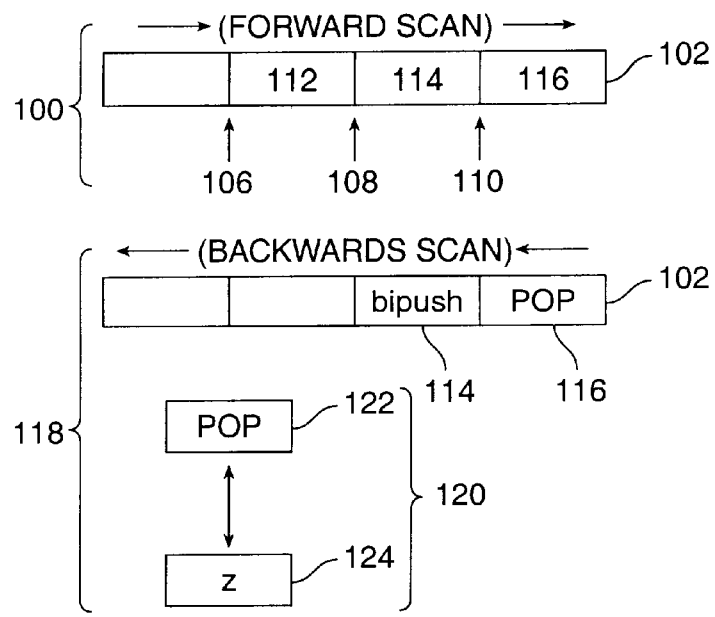
FIG. 4 is a flow diagram of a first aspect of the generation of a data flow graph for the links in a block of bytecode according to the present invention.

Turning now to FIG. 4, a flow diagram of a method for generating links within a bytecode block according to the present invention is illustrated. In a first step 100, a forward scan of a bytecode source file 102 is performed in order to determine the starts 106, 108, and 110 of the bytecodes 112, 114, and 116, respectively, because as is known, bytecodes can be of different lengths. Next, at step 118 a backward scan of the bytecode source file 102 is performed. During the backward scan step 118, the nodes of the DFG are generated as they occur. For example, if bytecode 116 is the instruction POP, as POP is read, a node 120 is created in the DFG including a POP instruction 122. If next, the instruction BIPUSH "2" is read at bytecode 108, the value "2" at 124 is linked to the POP instruction 122 that consumes it.

The present invention provides a significant increase in the efficiency in the generation of the DFG because the entire process of constructing a copy of the stack has been eliminated. The invention recognizes that because the stream of bytecodes are the instructions for a stack machine, the operands or values consumed by a bytecode instruction precede the instruction. When the bytecode file is read in reverse order, the step of creating a node in the DFG can be immediately performed after the bytecode is read.

Figure 5A:
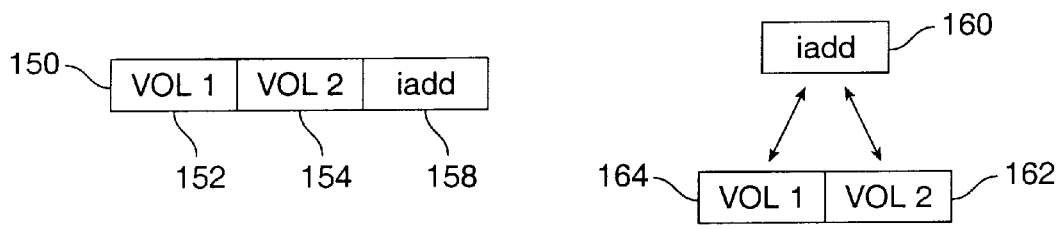
FIG. 5A is a block diagram for the generation of a node in a data flow graph for the instruction IADD according to the first aspect of the present invention.
Figure 5B:
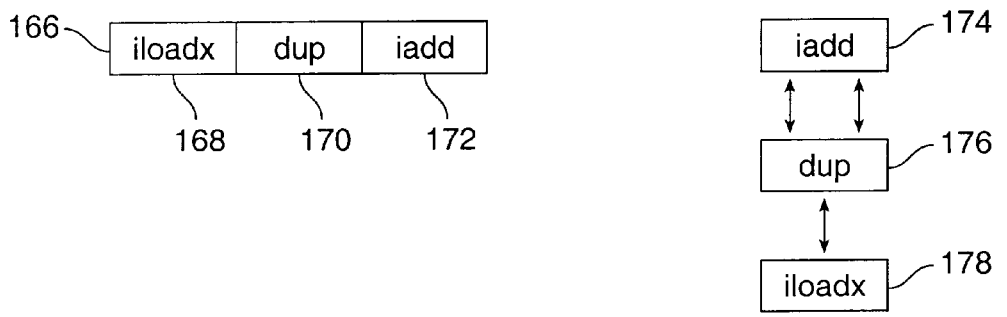
FIG. 5B is a block diagram for the generation of several nodes in a data flow graph for a plurality of instructions according to the first aspect of the present invention.

Further examples, not intended to be exhaustive, are illustrated in FIGS. 5A and 5B of the nodes in a DFG created from bytecode instructions according to the present invention. FIGS. 5A and 5B respectively are examples of a single instruction with two links, and a series of instructions with multiple links.

In FIG. 5A, a bytecode source block 150 has been first differentiated by a forward scan into bytecodes 152, 154 and 158. When the backward scan step is performed, an integer addition (IADD) instruction is read from bytecode 158, and a node 160 is created in the DFG. From the definition of the instruction IADD it is known that node 160 will consume two values. As the backward scan continues, these two values are read from bytecodes 154 and 152, created as nodes 162 and 164 in the node tree of the DFG, and then linked to node 160.

In FIG. 5B, a bytecode source block 166 has been first differentiated by a forward scan into bytecodes 168, 170 and 172. The sequence of bytecodes 166 implements the statement (X+X). In the backwards scan step the first bytecode 172 encountered is an IADD instruction. As explained with respect to the example of FIG. 5A, the IADD instruction generates a node 174 in the DFG with links to two values. Since the next bytecode 170 is a duplicate (DUP) instruction both of the links from node 174 are made to the node 176 for the DUP instruction. Next, bytecode 168 having an integer load X (ILOADX) instruction is read, and a node 178 with a link to node 176 is created. In this sequence in the node tree, the value in node 178, will be duplicated in node 176, and both values will be consumed in node 174. As will be appreciated by those of ordinary skill in the art from the above recited examples, when performing the backwards scan step, the particular DFG created will depend upon the sequence of bytecodes in the blocks generated by the CFG.

Figure 6:
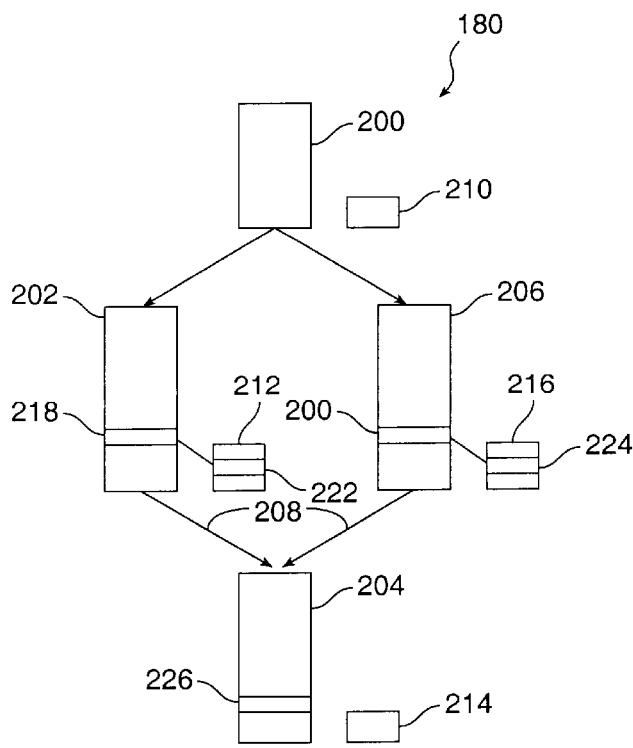
FIG. 6 is a flow diagram of a control flow graph suitable for illustrating a second aspect of the generation of a data flow graph for the links between blocks of bytecode according to the present invention.

According to a second aspect of the present invention, the propagation of values between blocks of bytecode in the CFG is determined. FIG. 6 illustrates a CFG 180 having several blocks of linked code 200, 202, 204, and 206. In the CFG 180, the blocks 202 and 206, that precede a join 208 are considered parallel. It should be appreciated that a join may connect a plurality of parallel blocks. When the CFG is generated, stack states, 210, 212, 214, and 216 are created for each block of bytecode 200, 202, 204, and 206, respectively. The stack states includes all the values still present on the stack after the bytecodes in the block associated with that stack have been executed. It should be appreciated that values on the stack are produced by instructions in the bytecode blocks. This is shown by the mapping of the instructions 218 and 220 to the stack states 222 and 224, respectively. For purposes of illustration to be described below, instruction 218 is PUSH "1", instruction 220 is PUSH "0", and instruction 226 is POP.

To determine when a value produced in an early block of bytecode is used or consumed by a subsequent block of bytecode to generate a link in the DFG between blocks of bytecode, an execution of the blocks is made while noting the consumption of a prior stack state value and identifying its source. This information is represented in the DFG as a link between the nodes of the consumption and production of the bytecodes. To establish links for all parallel blocks, the method in the prior art relied upon iterating through all possible control flow paths in the CFG. For example, to generate the DFG for links between blocks in the CFG 180, a first pass would be made through the path including blocks 200, 202 and 204, and then a second pass would be made through the path including blocks 200, 206 and 204.

According to the present invention, not all control flow paths must be traversed to form the DFG for links between parallel blocks of bytecode. Rather, the links in the DFG between blocks 200, 202, 204 and 206 can be generated simply by stepping through blocks 200, 202, 204 and then applying the information from the pass through blocks 200, 202, 204 to establish the links to block 206. The present invention exploits the fact that Java standards' require and the verification described above ensures that in properly formatted code, the stack states for any of the blocks preceding a join are the same.

For example, in CFG 180, both of the stack states 212 and 216 that precede the join 208 must be the same in both size and relative type. During execution, the consumption of any value in block 202 will be paralleled by a consumption of a value in block 206. As a result, for example, if the value corresponding to the stack state location 222 is used by the bytecode instruction in 226 of code block 204, then the bytecode instruction 226 also uses the value corresponding to the stack state location 224.

The following lines of pseudocode illustrate the point.
IF (some condition occurs)

$$\text{IF (some condition occurs)}$$
$$X = 1;$$
$$\text{ELSE}$$
$$X = 0;$$
$$\vdots$$
$$A = X + 2;$$

The assignment of a value to "A" in the expression "A=X+2" uses the value from either expression "X=1" or "X=0" that has been assigned to the implicit stack variable "X" as determined by the "IF (some condition occurs)" statement.

Figure 7A:
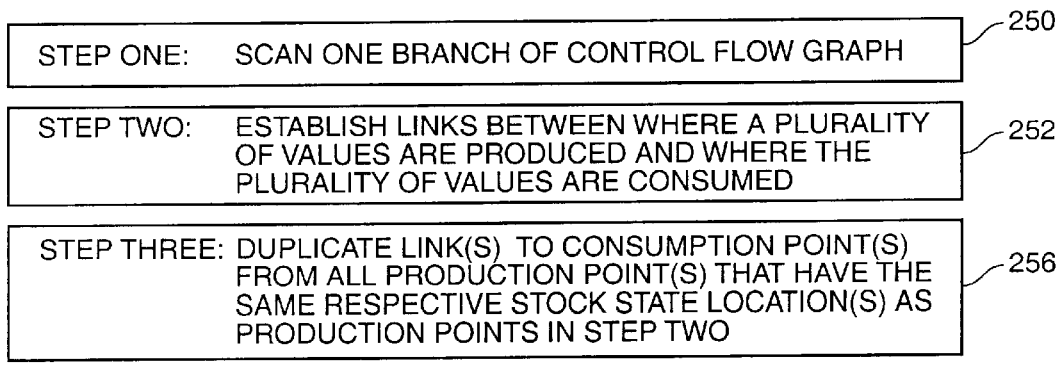
FIG. 7A is a block diagram of the steps in the method according to the second aspect of the present invention.

In FIG. 7A, a block diagram outlining the steps employed to generate a DFG according to the second aspect of the present invention is illustrated.

At step 250, a first branch of a CFG graph is scanned. Applied to CFG 180 in FIG. 6, a first pass through blocks 200, 202 and 204 is performed.

Figure 7B:
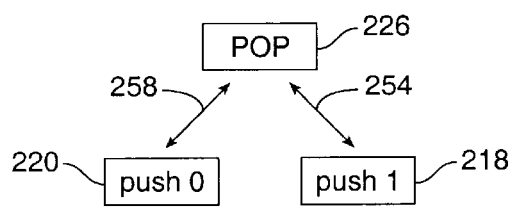
FIG. 7B is a block diagram for the generation of nodes in a data flow graph according to the second aspect of the present invention.

Next at step 252, links between the place a value is created and the place a value is consumed are made. As illustrated in FIG. 7B, a link 254 is made between the PUSH "1" instruction at location 218 in the CFG 180 that the POP instruction consumes at location 226 in the CFG 180.

Next at step 256, a link 258 is made between the PUSH 0 instruction at location 220 that the POP instruction consumes at location 226, because it is known that the data for this instruction occupies the same respective stack state location as the PUSH 1 instruction at location 218 in the CFG 180. As such, without traversing all paths in the CFG as relied upon by the prior art, according to the second aspect of the present invention, the links in a DFG between blocks of bytecodes can be more efficiently made. As joins are quite common throughout bytecode source code, the present invention represents a significant increase in efficiency. Where multiple joins exist, the increase in efficiency is even greater.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for linking bytecodes of an uninterrupted block of bytecodes in the formation of a data flow graph, the bytecodes including instruction bytecodes and operand bytecodes, the method comprising:

scanning said uninterrupted block of bytecodes in a forward manner to identify the start of each of said bytecodes;

scanning in a backward manner bytecodewise each of said bytecodes in said uninterrupted block of bytecodes, said scanning in a forward manner and said scanning in a backward manner performed without constructing a stack state to determine values used by bytecodes;

determining which bytecodes are used by other bytecodes based upon a definition associated with each instruction bytecode, said definition including an expected number of operand bytecodes for said each instruction bytecode;

creating a data flow graph node for each bytecode in each said uninterrupted block of bytecodes; and generating a link in said data flow graph that links each data flow graph node of said bytecodes to the data flow graph node of all other of said bytecodes used by said each of said bytecodes.

2. The method of claim 1 wherein said data flow graph comprises a node tree.

3. A method for linking bytecodes between uninterrupted blocks of bytecodes in the formation of a data flow graph, said uninterrupted blocks of bytecodes having links according to an order of execution of said uninterrupted blocks and wherein a stack state has been generated for each of said uninterrupted blocks of bytecodes, the bytecodes including instruction bytecodes and operand bytecodes, the stack states for blocks preceeding the same join being the same, the method comprising:

stepping through only a first path of a plurality of paths of said order of execution that terminates in a join to generate a link in said data flow graph between each node of each bytecode producing a value in one of said uninterrupted blocks and each node of each bytecode consuming said value in another of said uninterrupted blocks in said first path; and duplicating each link in said first path with a link for each node of each bytecode in all of said plurality of paths other than said first path for each bytecode producing a value having a similar stack location to each bytecode producing a value in one of said uninterrupted blocks in said first path.

4. The method of claim 3 wherein said stepping further comprises:

noting the consumption of a prior stack state value; and identifying the source of said consumption of a prior stack state value.

5. The method of claim 3 wherein said data flow graph comprises a node tree.

6. A program storage device readable by a machine, embodying a program of instructions executable by the machine to link bytecodes of an uninterrupted block of bytecodes in the formation of a data flow graph, the bytecodes including instruction bytecodes and operand bytecodes, comprising:

scanning said uninterrupted block of bytecodes in a forward manner to identify the start of each of said bytecodes;

scanning in a backward manner bytecodewise each of said bytecodes in said uninterrupted block of bytecodes, said scanning in a forward manner and said scanning in a backward manner performed without constructing a stack state to determine values used by bytecodes;

determining which bytecodes are used by other bytecodes based upon a definition associated with each instruction bytecode, said definition including an expected number of operand bytecodes for said each instruction bytecode;

creating a data flow graph node for each bytecode in each said uninterrupted block of bytecodes; and generating a link in said data flow graph that links each data flow graph node of said bytecodes to the data flow graph node of all other of said bytecodes used by said each of said bytecodes.

7. A program storage device readable by a machine, embodying a program of instructions executable by the machine to linking bytecodes between uninterrupted blocks of bytecodes in the formation of a data flow graph, said uninterrupted blocks of bytecodes having links according to an order of execution of said uninterrupted blocks and wherein a stack state has been generated for each of said uninterrupted blocks of bytecodes, the bytecodes including instruction bytecodes and operand bytecodes, the stack states for blocks preceeding the same join being the same, comprising:

stepping through a first path of a plurality of paths of said order of execution that terminates in a join to generate a link in said data flow graph between each node of each bytecode producing a value in one of said uninterrupted blocks and each node of each bytecode consuming said value in another of said uninterrupted blocks in said first path; and duplicating each link in said first path with a link for each node of each bytecode in all of said plurality of paths other than said first path for each bytecode producing a value having a similar stack location to each bytecode producing a value in one of said uninterrupted blocks in said first path.

* * * * *

UNITED STATES PATENT AND TRADEMARK OFFICE
CERTIFICATE OF CORRECTION

PATENT NO. : 6,233,733 B1
DATED : May 15, 2001
INVENTOR(S) : Sanjoy Ghosh

It is certified that error appears in the above-identified patent and that said Letters Patent is hereby corrected as shown below:

Column 1,
Line 31, replace "iload <varnum>" with -- *iload<varnum>* --.
Line 33, replace "varnum" with -- *varnum* --.

Column 6,
Line 45, delete "IF (some condition occurs)".

Signed and Sealed this

Twenty-sixth Day of March, 2002

*Attest:*

JAMES E. ROGAN
*Attesting Officer*   *Director of the United States Patent and Trademark Office*